United States Patent [19]

Toups, Jr. et al.

[11] Patent Number: 5,607,901
[45] Date of Patent: Mar. 4, 1997

[54] ENVIRONMENTALLY SAFE ANNULAR FLUID

[75] Inventors: John A. Toups, Jr., Sugar Land; David B. Young, Kingwood; Majeed H. Yousif, Woodlands; B. C. Smolen; Jonathan Holt, both of Houston, all of Tex.

[73] Assignee: BP Exploration & Oil, Inc., Cleveland, Ohio

[21] Appl. No.: 393,152

[22] Filed: Feb. 17, 1995

[51] Int. Cl.⁶ .................................. C09K 7/02; E21B 43/25
[52] U.S. Cl. ...................... 507/103; 507/116; 507/138; 507/136; 166/356
[58] Field of Search ............................ 507/103, 138, 507/112; 166/356

[56] References Cited

U.S. PATENT DOCUMENTS

| | | | |
|---|---|---|---|
| 1,999,147 | 4/1935 | Ambrose et al. | 507/103 |
| 3,613,792 | 10/1971 | Hyde et al. | 166/315 |
| 3,700,050 | 10/1972 | Miles | 175/65 |
| 3,831,678 | 8/1974 | Mondshine | 166/288 |
| 3,979,305 | 9/1976 | Fischer et al. | 507/103 |
| 4,258,791 | 3/1981 | Brandt et al. | 166/302 |
| 4,528,104 | 7/1985 | House et al. | 252/8.5 |
| 4,877,542 | 10/1989 | Leon et al. | 252/62 |
| 5,106,516 | 4/1992 | Mueller et al. | 507/138 |
| 5,232,910 | 8/1993 | Mueller et al. | 507/138 |
| 5,290,768 | 3/1994 | Ramsay et al. | 514/54 |

*Primary Examiner*—David B. Springer
*Attorney, Agent, or Firm*—Fay, Sharpe, Beall, Fagan, Minnich & McKee

[57] ABSTRACT

An environmentally acceptable, thermally insulating annular fluid comprised of a liquid which is non-aqueous, non-corrosive, and thermally insulating, a clay gellant, and a clay dispersant. A preferred packer fluid includes an ester originated from a vegetable or animal oil as at least a major portion of the liquid phase.

19 Claims, 1 Drawing Sheet

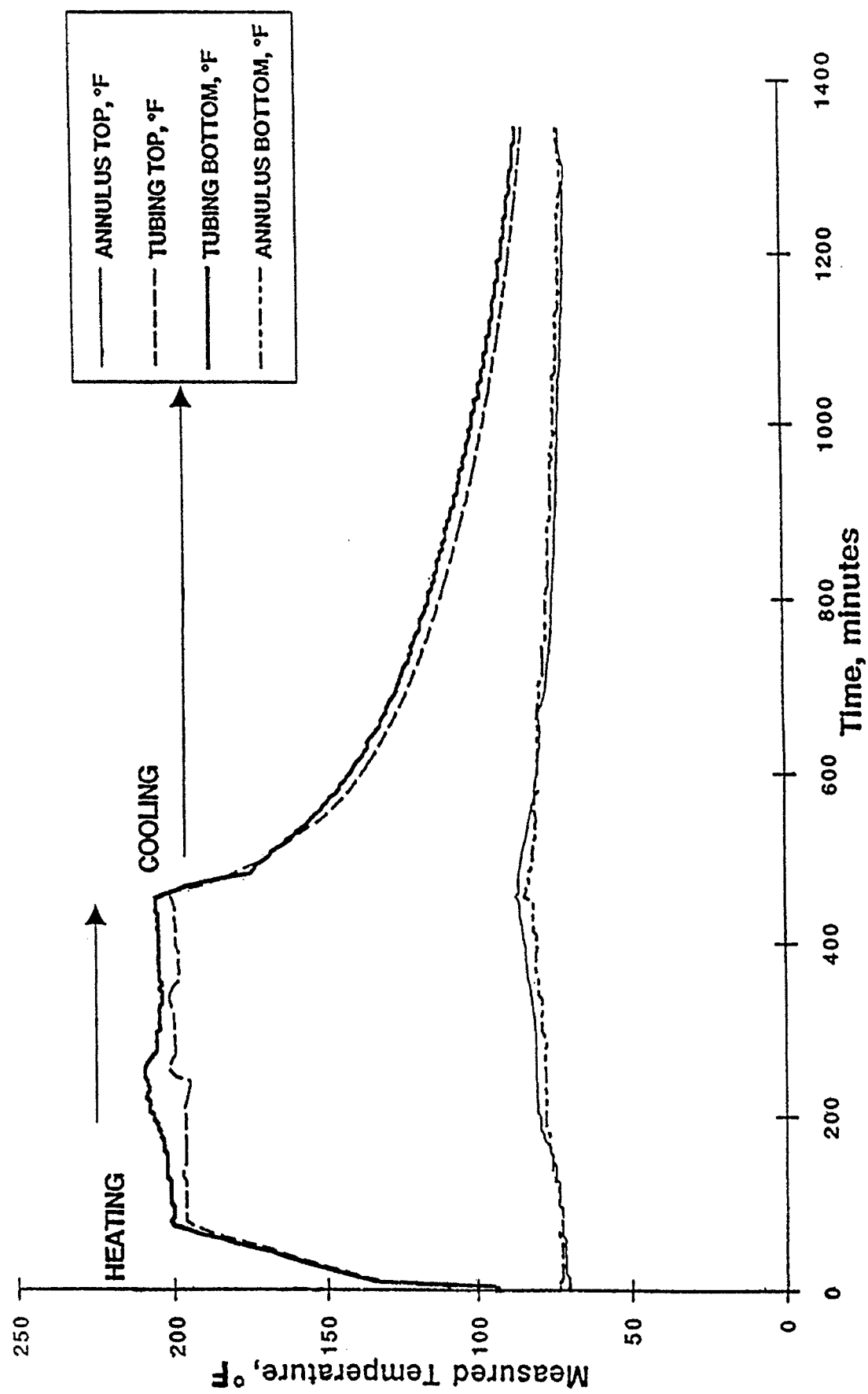

5,607,901

ENVIRONMENTALLY SAFE ANNULAR FLUID

BACKGROUND OF THE INVENTION

This invention relates to an annular fluid composition for insulating a wellbore. More particularly, this invention relates to an annular fluid composition that may be economically prepared and is environmentally acceptable.

The annular fluid composition of this invention is particularly well suited for use as a wellbore insulation material in subsea hydrocarbonaceous fluid drilling operations. Throughout the specification, numerous references will be made to the use of the fluid in subsea drilling operations, however, it should be realized that the invention could be used in any drilling operation which requires an annular fluid and, in fact, in any application requiring a thixotropic insulating fluid.

Annular fluids or packer fluids are liquids which are pumped into an annular opening between a casing and a wellbore wall or between adjacent, concentric strings of pipe extending into a wellbore. These fluids are especially necessary in drilling operations conducted in low temperature venues of the world, for example, those areas having a permafrost. A permafrost is a thick layer of frozen surface ground which may be several hundred feet thick and presents a great obstacle to the removal of relatively warm fluids through a well pipe. Particularly, the warm fluid in the well pipe causes thawing of the permafrost in the vicinity of the well resulting in subsidence which can impose compressive and/or tension loads high enough to fracture the wall casing and hence allow the escape of oil. In addition, the warm gas or oil coming to the surface in the well pipe becomes cooled by giving up its heat to the permafrost and hydrate crystals are formed which can freeze together and block the well pipe.

Heavy oil production is another drilling operation which often requires a packing fluid. In heavy oil production, a high pressure steam is injected into the well and the oil reservoir to heat the fluids in the reservoir, causing a thermal expansion of the crude oil, an increase in reservoir pressure and a decrease of the oil's viscosity. In this process, damage to the well casing may occur when heat is transferred through the annulus between the well tubing and the casing. The resulting thermal expansion of the casing can break the bond between the casing and the surrounding cement, causing steam leakage between the casing and the oil well wall. Accordingly, an insulating medium such as a packer fluid is used to insulate the well tubing. The packer fluid also reduces heat loss and saves on the energy requirements in steam flooding.

In addition to steam injection processes and operations which require production through a permafrost layer, subsea fields required specially designed systems which typically require a packer fluid. For example, a subsea oil reservoir temperature may be between about 120° F. and 250° F., while the temperature of the water through which the oil must be conveyed is often as low as 32° F. to 50° F. Conveying the high temperature oil through such a low temperature environment can result in an oil temperature reduction and consequently the separation of the oils various hydrocarbon fractions and deposition of paraffins, waxes, asphaltenes, and gas hydrates. The agglomeration of these oil constituents can cause blocking or restriction of the wellbore, resulting in significant reduction or even catastrophic failure of the production operation.

To meet the above-discussed insulating demands, a variety of packer fluids have been developed. For example, U.S. Pat. No. 3,613,792 describes an early method of insulating wellbores. In the 3,613,792 patent, simple fluids and solids are used as the insulating medium. U.S. Pat. No. 4,258,791 improves on these insulating materials by disclosing an oleaginous liquid such as topped crude oils, gas oils, kerosene, diesel fluids, heavy alkylates, fractions of heavy alkylates and the like in combination with an aqueous phase, lime, and a polymeric material. U.S. Pat. No. 4,528,104 teaches a packer fluid comprised of an oleaginous liquid such as diesel oil, kerosene, fuel oil, lubricating oil fractions, heavy naphtha and the like in combination with an organophillic clay gellant and a clay dispersant such as a polar organic compound and a polyfunctional amino silane. U.S. Pat. No. 4,877,542 teaches a thermal insulator fluid consisting of a heavy mineral oil as the major liquid portion, a light oil as a minor liquid portion, a smectite-type clay, calcium oxide and hydrated amorphous sodium silicate. U.S. Pat. No. 5,290,768 teaches a thixotropic composition containing ethylene glycol and welan gum. The above-discussed patents are herein incorporated by reference.

Although many of the above-described packer fluids function adequately, they fail to meet the ever increasing industrial and governmental concerns for the environment. Particularly, many of the constituents of the above-described packer fluids are unacceptable from an environmental standpoint and are often prohibited for use by government regulation. For example, the mineral oils and heavy crude oils required by several of the above discussed patents are not permitted for use in areas such as the Gulf of Mexico.

Among the above patents, U.S. Pat. Nos. 3,613,792 and 5,290,768 describe insulating fluids which may be environmentally acceptable. However, U.S. Pat. No. 3,613,792 describes relatively ineffectual insulating fluids which are clearly inferior to the thixotropic agents of the present invention. U.S. Pat. No. 5,290,768 describes a allegedly environmentally acceptable packer fluid, however, the packer fluid contains ethylene glycol which is not readily biodegradable and may be corrosive.

Accordingly, a significant advantage is provided to the art by the present annular fluid having excellent insulation properties and environmental acceptability.

SUMMARY OF THE INVENTION

A primary advantage of this invention is to provide a annular fluid which is environmentally acceptable, non-aqueous, continuous phase fluid, non-corrosive, and thermally insulating.

It is a further advantage of this invention that the annular fluid is suitable for use in the Gulf of Mexico.

Additional objects and advantages of the invention will be set forth in part in the description that follows and in part will be obvious from the description, or may be learned by practicing the invention. The objects and advantages of the invention may be realized and attained by means of the instrumentalities and combinations particularly pointed out in the appended claims.

To achieve the foregoing objects and in accordance with the purpose of the invention as embodied and broadly described herein, the annular fluid of the invention comprises: (a) a non-aqueous, non-corrosive, environmentally acceptable liquid, preferably selected from the group consisting of esters, polyalpha olefins, ethers, food grade paraffins, linear alpha-olefins and mixtures thereof; (b) a clay gellant; and (c) a clay dispersant.

Preferably, the liquid comprises between about 97 and about 87 percent by volume of the packer fluid, the clay gellant comprises between about 1 and about 7 percent by volume of the fluid, and the polar dispersant comprises between about 2 and about 6 percent by volume of the packer fluid. More preferably, the liquid comprises between about 94.5 and about 92.5 percent of the packer fluid, the clay gellant between about 1.5 and about 3.5 percent, and the polar dispersant about 4 percent.

In a preferred embodiment, the liquid comprises an ester oil of vegetable or animal origin, the clay gellant comprises an organophillic clay and the dispersant is a polar organic compound such as methanol, isopropanol, ethanol, glycols, glycerols, glycerine or mixtures thereof.

A method of insulating a wellbore through which a fluid passes from a subsea formation comprises drilling a bore hole from the subsea surface, placing a well tubing in the bore hole, forming an annular space around the well tubing passing from the sea floor to the sea surface, pumping the above described annular fluid into the annular space and removing oil through the bore hole.

BRIEF DESCRIPTION OF THE DRAWINGS

The invention consists in the novel parts, construction, arrangements, and improvements shown and described. The accompanying drawing which is incorporated in and constitutes a part of the specification illustrates one embodiment of the invention and together with the description serves to explain the principles of the invention.

The Figure is a graphical representation of the insulation properties of the inventive annular fluid.

DETAILED DESCRIPTION OF THE INVENTION

While the invention will be described in connection with a preferred embodiment, it will be understood that it is not intended to limit the invention to that embodiment. On the contrary, it is intended to cover all alternatives, modifications and equivalents as may be included within the spirit and scope of the invention defined by the appended claims.

The liquid phase of the annular fluid is a non-aqueous, non-corrosive, environmentally acceptable fluid. As utilized herein, an environmentally acceptable fluid is a liquid which meets U.S. Environmental Protection Agency requirements (ex. sheen and bioassay) for discharge into bodies of water and tributaries. The liquid is preferably selected from the group consisting of esters, polyalpha olefins, ethers, food grade paraffins linear alpha-olefins and mixtures thereof. In a preferred embodiment, the liquid is an ester oil of vegetable or animal origin. U.S. Pat. Nos. 5,106,516 and 5,232,910, herein incorporated by reference, provide a detailed description of a particularly suitable ester. Specific examples of commercially available suitable liquids are Baroid Corporation's PETROFREE, M-I Drilling Fluid Co.'s NOVASOL LIQUID, Baker-Hughes Inteq's SYNTEQ and Anchor Drilling Fluids AQUAMUL LIQUID.

The clay gellant of the invention is preferably a hydrophilic clay. More preferably, the clay is an organophillic clay. Clays which are particularly preferred in this invention are the water-swelling smectite clays such as montmorillonite, hectorite, saponite and particularly bentonite. Smectite-type clays prepared synthetically or by either a pneumatolytic or hydrothermal synthesis process can also be used. Preferably, the clay has an average particle size between about 0.1 and 6.0 microns. Among the particularly preferred organophillic clays VG-69 from M-I Drilling Fluids Co., Geltone II from Baroid Corporation, and Carbogel from Baker-Hughes Inteq are particularly suitable.

Preferably the clay comprises between about 1 and about 7 percent by volume of the fluid. More preferably, the clay comprises between about 1.5 and 3.5 percent by volume of the fluid. In a commercial operation in which barrels are the typical units of measure, the clay preferably comprises between about 10 pounds and about 40 pounds per barrel of liquid. More preferably, the clay comprises between about 15 pounds and about 30 pounds per barrel of liquid.

The clay dispersant of the invention can be any polar organic material well known to those skilled in the art. Such dispersants are generally low molecular weight, polar organic compounds, such as alcohols, ketones, diketones, nitryl alkines, alkine carbonates, ether alcohols, ether esters, and the like. Representative dispersants of the preferred invention are methanol, ethanol, acetone, methyl ethyl ketone, acetenyl acetone, acetophenone, diethyl ketone, methyl-n-propyl ketone, 2, 3-butane dione, nitro methane, nitro ethane, 1-nitro propane, propylene carbonate, ethylene carbonate, ethylene glycol monomethyl ether, diethylene glycol monomethyl ether, ethylene glycol monoacetate, diethylene glycol monoacetate, and similar molecular weight polar organic compounds. Commercially available methanol, due to its low cost, is a particularly preferred polar dispersant.

Preferably, the dispersant comprises between about 2 and about 6 volume percent of the fluid. More preferably, the polar dispersant comprises about 4 volume percent of the fluid. In a commercial operation in which barrels are the typical unit of measure, the dispersant comprises between about ½ gallon and about 2½ gallons per barrel of liquid.

Preferably, the apparent viscosity of the inventive fluid ranges from 40 to about 150 centipoise. This is primarily controlled by the concentration of organophillic clay and dispersant.

As is known to those skilled in the art, a weighting agent, such as barite may be added to the fluid to increase the fluid's density. In the event barite is added, emulsifiers, surfactants and brine may also be added to the fluid.

An exemplary manner of preparing a preferred composition of the annular fluid on a per barrel basis is to mix about 20 pounds of the organophillic clay into one barrel of the environmentally acceptable fluid. Preferably, mixing is continued for about 30 minutes. Thereafter, about 1.68 gallons of the polar dispersant is slowly added to the composition and mixing is continued for an additional 30 minutes. The mixed fluid can then be placed in the wellbore annulus according to any method currently used in the art.

In order to more completely describe the present invention, the following examples are given. The examples are offered to more fully illustrate the practice of this invention but are not intended to limit the invention.

EXAMPLES 350 ml. samples of Baroid PETROFREE, clay, and methanol (according to the quantities depicted in Table #1) were mixed together at a moderate speed on a Hamilton Beach mixer. A variety of rheological properties (Table #1) were evaluated for each sample at room temperature (75° F.) using a Fann 35 VG meter.

In the tables:
A.V. is apparent viscosity in centipoise (cps)
P.V. is plastic viscosity in centipoise
Y.P. is yield point in pounds per 100 ft$^2$
Gels is gel strength at 10 seconds

TABLE 1

| | Initial Rheologies at 75° F. | | | | | | | | |
|---|---|---|---|---|---|---|---|---|---|
| Sample # | 1 | 2 | 3 | 4 | 5 | 6 | 7 | 8 | 9 |
| Geltone II, grams | 20 | 20 | 20 | — | — | — | — | — | — |
| M-I VG-69, grams | — | — | — | 20 | 20 | 20 | — | — | — |
| Carbogel, grams | — | — | — | — | — | — | 20 | 20 | 20 |
| methanol, % | 2 | 4 | 6 | 2 | 4 | 6 | 2 | 4 | 6 |
| A.V., cps | 31 | 35 | 33.5 | 14 | 65 | 48 | 60 | * | * |
| P.V., cps | 13 | 17 | 19 | 12 | 21 | 17 | 26 | * | * |
| Y.P. | 36 | 36 | 29 | 4 | 88 | 62 | 70 | * | * |
| Gels | 27 | 27 | 23 | 3 | 54 | 37 | 48 | * | * |

*Too high to measure

The samples were then hot rolled using an OFI hot-rolling oven for sixteen hours at 150° F. Thereafter, the samples were cooled to room temperature, re-mixed for five minutes at a moderate shear on a Hamilton Beach mixer and their rheological properties re-evaluated (Table #2).

TABLE 2

| | Rheologies after hot rolling at 150° F. | | | | | | | | |
|---|---|---|---|---|---|---|---|---|---|
| Sample # | 1 | 2 | 3 | 4 | 5 | 6 | 7 | 8 | 9 |
| A.V., cps | 50 | 51 | 43 | 19 | 85 | 78 | 46 | 146 | 1295 |
| P.V., Cps | 21 | 23 | 23 | 14 | 20 | 22 | 28 | 68 | 43 |
| Y.P. | 58 | 56 | 40 | 10 | 130 | 111 | 36 | 156 | 173 |
| Gels | 44 | 39 | 24 | 9 | 80 | 67 | 24 | 124 | 118 |

Table #3 demonstrates the results of additional fluid compositions prepared as described above with rheological measurements taken at 120° F.

TABLE 3

| | Initial Rheologies at 120° F. | | | | | |
|---|---|---|---|---|---|---|
| Sample # | 10 | 11 | 12 | 13 | 14 | 15 |
| M-I VG-69 grams | 20 | — | — | — | — | — |
| Carbogel, grams | — | 15 | 15 | 17.5 | 20 | 20 |
| Methenol, % | 4 | 4 | 6 | 4 | 4 | 6 |
| A.V., cps | 67.5 | 33.5 | 46.5 | 124 | 137.5 | 106.5 |
| P.V., Cps | 15 | 14 | 15 | 23 | 22 | 21 |
| Y.P. | 105 | 29 | 63 | 202 | 231 | 171 |
| Gels | 70 | 22 | 36 | 129 | 156 | 121 |

Samples 10, 13, and 14, which demonstrated excellent apparent viscosities of greater than 50 centipoise, were static-aged for sixteen hours at 190° F. and their rheological properties re-evaluated at 120° F. (Table #4). Thereafter, the samples were cooled to room temperature and the presence of free oil (separation %) was determined by visual inspection.

TABLE 4

| | Rheologies after static-aging for 16 hrs at 190° F. | | |
|---|---|---|---|
| Sample # | 10 | 13 | 14 |
| A.V., cps | 45 | 52 | 51 |
| P.V., Cps | 14 | 14 | 12 |
| Y.P. | 62 | 76 | 78 |
| Gels | 40 | 53 | 52 |
| Separation, % | 0 | 0 | 0 |

In order to determine the amount of long-term separation that occurs, five samples (#16–#20) prepared in a manner consistent with the prior samples were evaluated at various time intervals of heating at 190° F. Each formulation was placed in a test tube (15 cm. tall with a 1.75 cm. diameter) and one test tube of each of the five formulations placed in three separate 500 ml. Baroid static-aging cells. After pressurizing to 100 psi with nitrogen, the static-aging cells were placed in an oven at 190° F. A first static-aging cell was removed after 16 hours, a second cell after 40 hours, and a third after 112 hours. After each cell was cooled and opened, visual observations were made to determine if free oil had separated from the sample (Table #5).

TABLE 5

| | Fluid/solids separation tests | | | | |
|---|---|---|---|---|---|
| Sample # | 16 | 17 | 18 | 19 | 20 |
| M-I VG-69, grams | 20 | — | — | — | — |
| Carbogel, grams | — | 15 | 15 | 20 | 20 |
| methanol, % | 4 | 4 | 6 | 4 | 6 |
| Free oil visible after: | | | | | |
| 16 hrs @ 190° F. | no | no | no | no | no |
| 40 hrs @ 190° F. | no | no | no | no | no |
| 112 hrs @ 190° F. | no | yes | yes | yes | yes |

A wellbore model was designed and constructed to evaluate the thermal insulating properties of fluids in an annular space. The model was constructed of a five foot section of 2⅞" tubing inserted in a 9⅝" fiberglass casing to create a 3.25" annular section between tubing and casing. Two resistance temperature detectors were placed one foot from each end of the model, two at the outside surface of the tubing, and two at the interior wall of the casing. For the test, approximately 20 gallons of insulating fluid having the relative composition of sample #10 were prepared in a 50 gallon mixing tank. This insulating fluid was then pumped into the annular space of the wellbore model. With this configuration, the temperature differential across the annulus was measured.

Water was heated to 200° F. and circulated at a flow rate of 5.0–5.5 gallons per minute through the tubing. With the heated water circulating through the tubing, the temperature on the outside of the tubing (top and bottom) and the inside of the 9⅝" casing (top and bottom) was recorded at five minute intervals. Using these recorded temperatures, the temperature differential across the annular space was calculated.

FIG. 1 demonstrates a 24 hour test cycle with fluid heated and circulated for eight hours and additional circulation of the water for 16 hours without heating.

A preferred packer fluid formulation was then evaluated for toxicity by performing a bioassay test. The tested fluid was the composition of sample #10. Test results indicated that the packer fluid formulation was environmentally acceptable for offshore use, having a 48 hour rangefinder LC$_{50}$ of greater than 300,000 parts per million. The Environmental Protection Agency (EPA) mandates that any fluids being discharged in U.S. off-shore waters must be tested for toxicity by running a mysid shrimp bioassay test for 96 hours. Any fluid having a LC$_{50}$ (lethal concentration to 50% of the test shrimp) of less than 30,000 ppm fails the test and cannot be discharged into U.S. waters.

It is shown by the above results, that the subject invention demonstrates the viscosity, thermal insulation properties, stability, and environmental compatibility necessary to function as a superior packer fluid.

Thus, it is apparent that there has been provided, in accordance with the invention, a packer fluid that fully satisfies the objects, aims, and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations that fall within the spirit and broad scope of the appended claims.

What is claimed:

1. A thermally insulating fluid comprised of:
   a) a liquid selected from the group consisting of esters, polyalpha olefins, ethers, food grade paraffins and linear alpha-olefins;
   b) a hydrophilic clay; and,
   c) a polar-organic solvent.

2. The fluid of claim 1 wherein said liquid is a polyalpha olefin.

3. The fluid of claim 1 wherein said liquid is comprised of an ester derived from vegetable or animal oil.

4. The fluid of claim 1 wherein said liquid is comprised of Baroid PETROFREE.

5. The fluid of claim 1 wherein said clay is comprised of an organophillic clay.

6. The fluid of claim 1 wherein said clay dispersant is selected from the group consisting of methanol, ethanol, acetone, methyl ethyl ketone, acetenyl acetone, acetophenone, diethyl ketone, methyl-n-propyl ketone, 2, 3-butane dione, nitro methane, nitro ethane, 1-nitro propane, propylene carbonate, ethylene carbonate, ethylene glycol monomethyl ether, diethylene glycol monomethyl ether, ethylene glycol monoacetate, diethylene glycol monoacetate, and mixtures thereof.

7. The fluid of claim 6 wherein said clay dispersant is an alcohol.

8. The fluid of claim 7 wherein said alcohol is methanol.

9. The fluid of claim 1 further comprising a weighting agent.

10. The fluid of claim 9 wherein said weighting agent comprises barite.

11. The fluid of claim 1 further comprising a surfactant or emulsifier.

12. The fluid of claim 1 wherein said liquid comprises between about 87 and about 97 volume percent of said fluid, said clay gellant comprises between about 1 and about 7 volume percent of said fluid, and said clay dispersant comprises between about 2 and about 6 volume percent of said fluid.

13. The fluid of claim 1 wherein said liquid comprises between about 92.5 and about 94.5 volume percent of said fluid, said clay gellant comprises between about 1.5 and about 3.5 volume percent of said fluid, and said clay dispersant comprises about 4 volume percent of said fluid.

14. A thermally insulating annular fluid comprised of:
   a) a non-aqueous, non-corrosive, liquid selected from the group consisting of esters, polyalpha olefins, ethers, food grade paraffins, linear alpha-olefins and mixtures thereof, which has a 48 hour range finder $LC_{50}$ of greater than 30,000 ppm;
   b) a hydrophilic clay; and
   c) a polar-organic solvent.

15. The fluid of claim 14 wherein component a) comprises between about 87 and about 97 volume percent of said annular fluid and component b) comprises between about 1 and about 7 volume percent of said annular fluid and component c) comprises between about 2 and about 6 volume percent of said annular fluid.

16. The fluid of claim 14 further comprising a weighting agent.

17. The fluid of claim 14 further comprising a surfactant or emulsifier.

18. A thermally insulating fluid comprised of:
   a) a liquid ester derived from vegetable or animal oil;
   b) a hydrophilic clay; and,
   c) a polar-organic solvent.

19. A thermally insulating fluid comprised of:
   a) a liquid linear alpha olefin;
   b) a hydrophilic clay; and
   c) a polar-organic solvent.

* * * * *